Jan. 29, 1957 R. L. BARRON 2,779,904
ELECTRONIC CONTROL SYSTEM
Filed May 17, 1951 3 Sheets-Sheet 1

INVENTOR.
RALPH L. BARRON
BY
W. D. Sullivan
ATTORNEY

INVENTOR.
RALPH L. BARRON
BY
W. G. Sullivan
ATTORNEY

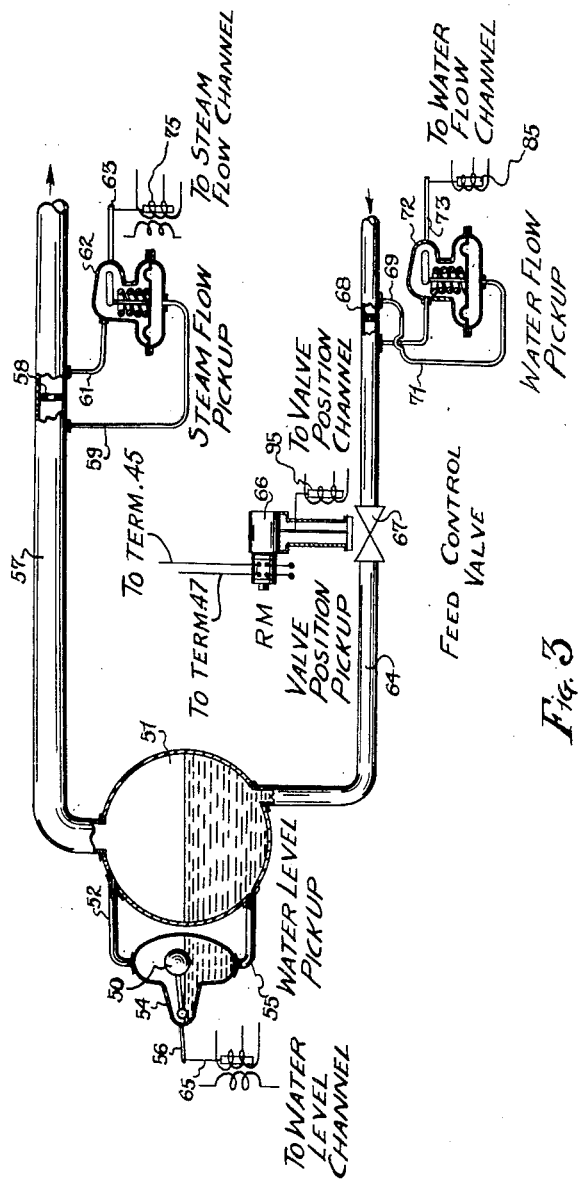

United States Patent Office
2,779,904
Patented Jan. 29, 1957

2,779,904

ELECTRONIC CONTROL SYSTEM

Ralph L. Barron, Erie, Pa.

Application May 17, 1951, Serial No. 226,900

4 Claims. (Cl. 318—28)

This invention relates to control systems, and more particularly to electrical control systems applicable to controlled variation of valves, motors, rheostats or like control members in response to changes of magnitude of a condition such as liquid level, steam flow, rate of flow, temperature, pressure or other physical, chemical or electrical condition.

I am aware of prior electrical control systems employed for various purposes and which utilize bridge circuits or equivalent balancing means, such systems essentially comprising instrumentalities for detecting departure from a condition of balance and one or more variable elements controlled by said instrumentalities for automatically maintaining a condition of balance.

However, such control systems involve relatively movable and contacting parts in the electrical portion of the control system resulting in undesirable mechanical and electrical friction and wear. For example, an instrument having a pointer movable along a dial face to indicate rate of flow or the like, contacts a slide wire to change resistance in circuits including the slide wire and pointer. In as much as the pointer normally operates along a limited length of the slide wire, wear is concentrated in this zone resulting in frequent repair or replacement of the slide wires involved in this portion of such a control system. Accuracy of such a control system is dependent upon the number of turns of wire on the slide wire and obviously cannot be too good if one uses wire of sufficient size to prevent constant replacement of the slide wire due to mechanical wear and friction.

I have devised an electronic control system wherein frequency of oscillating circuits detects a departure from a condition of balance and the frequency change is used to actuate a control or controls to re-establish a condition of balance. There are no moving parts creating mechanical friction in the electrical portion of the control system, consequently repair and replacement of parts due to mechanical wear is eliminated. According to the invention, pickups such as manometers, thermostats, floats or like devices adapted to measure changes of magnitude of a condition are mechanically linked to oscillating circuits whereby the frequency of an oscillating circuit will be changed in response to movement of its associated pickup device. The outputs of the oscillating circuits are connected to discriminators to permit translation of frequency deviation to a smooth and linear polarized output voltage. Dependent upon the particular control arrangement desired, the oscillating circuits for two pickups are connected to a modulator to permit balancing the demands of these circuits. In like manner, circuits for additional pickups including a discriminator and modulator, are successively associated and the output of the final pickup is fed to a modulator for a master oscillator. A second modulator for the master oscillator is influenced by the position of the control member. The output of the master oscillator is fed to a cathode follower which in turn feeds a voltage amplifier. The amplifier feeds a discriminator whose polarized voltage output controls the electrical means actuating the control member.

It is a primary object of the invention to provide an electronic control system employing frequency deviation to detect a departure from a condition of balance and utilize said frequency change to actuate a control or controls to re-establish a condition of true balance.

Another object of the invention is to provide an electronic control system of the above type embodying apparatus which is exceptionally reliable, of great accuracy, which has a high order of sensitivity, with freedom from delicate contacts, possessing highly accurate reproducibility of control, and which requires a minimum of maintenance attention or renewal.

A further object of the invention is to provide in electrical control systems improved circuits and methods for detecting unbalance and for effecting restoration of a balanced condition.

Another object of the invention is to provide an electronic control system which is particularly adapted to regulating the feed water flow to a boiler.

Another object of the invention is to provide an electrical control system wherein mechanical friction with its resultant wear is eliminated in the electrical portion of the system.

These and other novel features which I believe to be characteristic of my invention will be set forth with particularity in the appended claims. The invention itself, however, both as to its organization and method of operation, together with further objects and advantages thereof, may best be understood with reference to the following description taken in connection with the accompanying drawings in which:

Figure 3 is a schematic diagram of the pickups showing their mechanical linkage to the electrical portion of the control system.

The invention is illustrated and described as applied to an automatic feed water regulator for boilers but it is understood that it is equally adaptable to any control system wherein it is desired to sensitively actuate a control member to maintain a condition of balance in the system despite changes of magnitude of one or a plurality of conditions tending to cause unbalance in the system.

Figure 1:
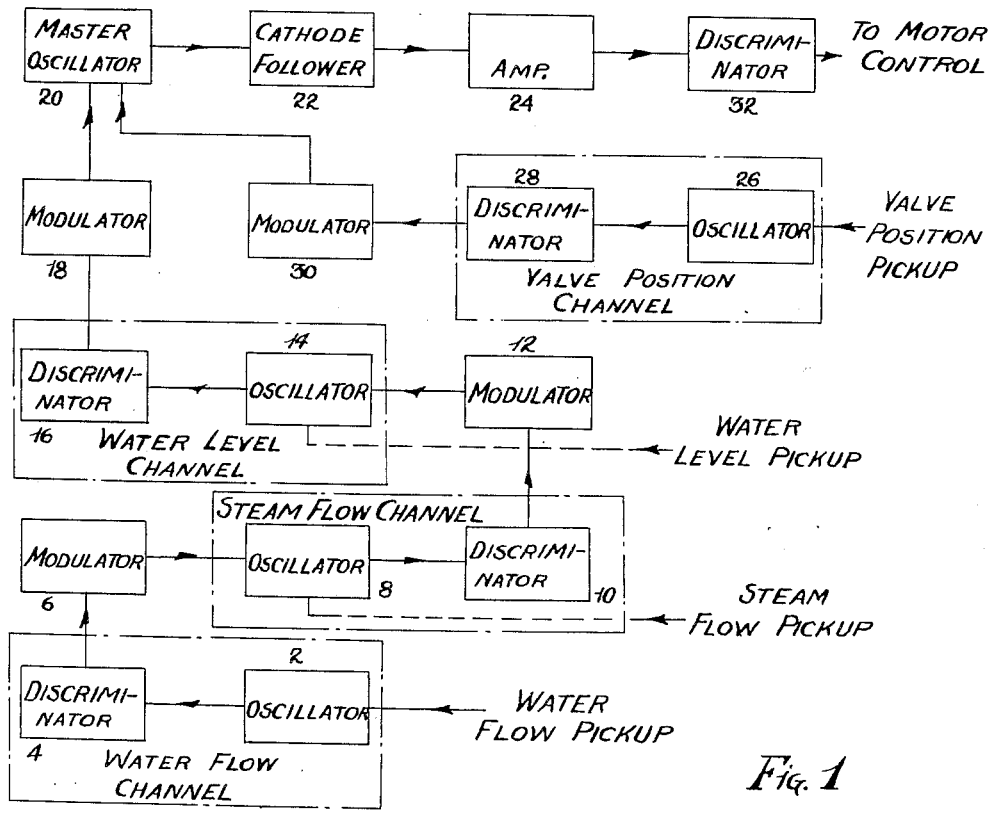
Figure 1 is a block diagram representing an embodiment of my invention applied in connection with an automatic feed water regulator for boilers.

Referring now to the drawings and particularly Figure 1, it will be noted that the control system as applied to a boiler feed water regulator comprises four pickups, their respective control channels and modulators, a master oscillator and modulators, a cathode follower, a voltage amplifier and a discriminator. The water flow channel indicated as elements 2 and 4, essentially comprises an oscillating circuit feeding a discriminator whose output in turn feeds a modulator, indicated as element 6, intimately associated with the steam flow channel, shown as elements 8 and 10. As with the water flow channel these elements are oscillator and discriminator. The output of the discriminator then feeds a modulator, element 12, associated with the water level channel whose elements 14 and 16 are also oscillator and discriminator respectively. The output of the discriminator, element 16, in turn is fed to a modulator, element 18, whose output in turn is coupled to the frequency determining network of the master oscillator, element 20. Master oscillator output is then fed to a cathode follower, element 22, in turn to a voltage amplifier element 24, whose output then feeds a discriminator, element 32. The voltage output of this discriminator is then fed to a motor control unit. A fourth control channel, the valve position channel shown as elements 26 and 28, feeds a modulator, element 30, also associated with the master oscillator frequency determining network.

Figure 4:
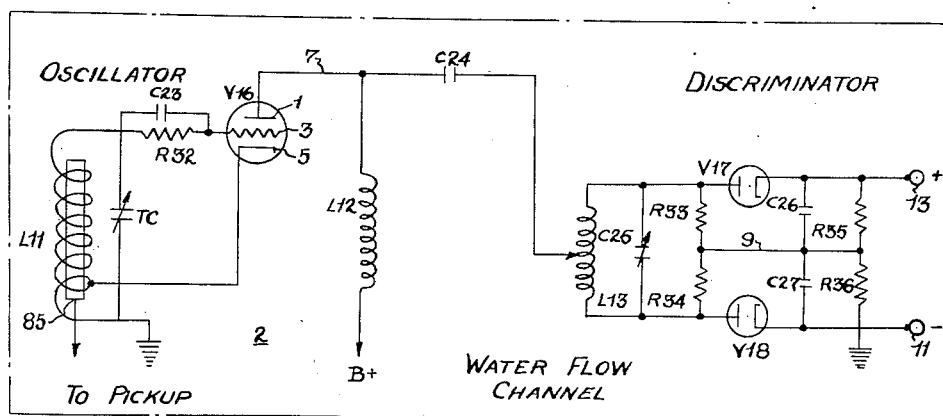
Figure 4 is a schematic diagram of a primary pickup as applied to an automatic feed water regulator for boilers.

Referring now to Figure 4, specifically the water flow channel shown as elements 2 and 4, comprises respectively, a conventional oscillator commonly known as the Hartley oscillator having an iron core 85 mechanically linked to the water flow pick-up whereby the core will be moved axially in accordance with changes in water flow or the rate of water flow. Any suitable means may be employed for moving core 85 in accordance with change in rate of water flow and one such means will subsequently be described. Core 85 of element 2 is encircled by an inductance coil L11 which is connected in series-parallel with a capacitor C23 and resistance R32 and thence to the grid of a conventional triode vacuum tube V16, having a grid 3, a plate 1, and cathode 5. The conventional heater or filament for tubes of this type is not shown. Tube V16 is connected through a coil or inductance L12 to a source of direct current such as a battery indicated at B plus. In a well understood fashion A. C. voltage will be transmitted from tube V16 through lead 7 thence to C24 and finally to L13. There will be some voltage transmitted through the loosely coupled coil L12 to L13. It is obvious that the frequency of the voltage transmitted via this path will change upon movement of core 85. L13 is a center tapped inductance forming part of a conventional discriminator circuit shown as element 4. The A. C. voltage transferred from element 2 through the path indicated above is then rectified in any suitable manner as by vacuum tube rectifiers comprising a plate and cathode as shown at V17 and V18. Capacitor 25 and resistances R33 and R34 are connected in parallel across inductance L13. As is also the parallel network of C26, C27, R35 and R36. In a well known manner the magnitude and polarity of the D. C. voltage across the output terminals 11 and 13 of the discriminator will be polarized in accordance with the position of the iron core 85 of the oscillator. If the discriminator inductance tuned by C25 is set at its center frequency design point with the oscillator tuned to that frequency by means of TC, there will be no voltage existing across output terminals 11 and 13 of element 4. Tuning or changing of the oscillator 2 frequency by means of the iron core 85 within the oscillator inductance L11 will then cause a change of frequency in the voltage through lead 7 to the discriminator coil L13. The discriminator functions in such fashion that the magnitude and direction of this frequency change from the center frequency point then determines the magnitude and polarity of the voltage across the discriminator output terminals 11 and 13. We have then as the water flow channel an oscillator element 2 whose frequency is determined by the position of its iron core 85, whose movement is controlled by mechanical linkage from its pickup and a discriminator element 4, whose inherent function translates a change of oscillator frequency to a polarized D. C. voltage dependent upon the direction and magnitude of the frequency deviation from the desired center frequency of operation.

Figure 2:
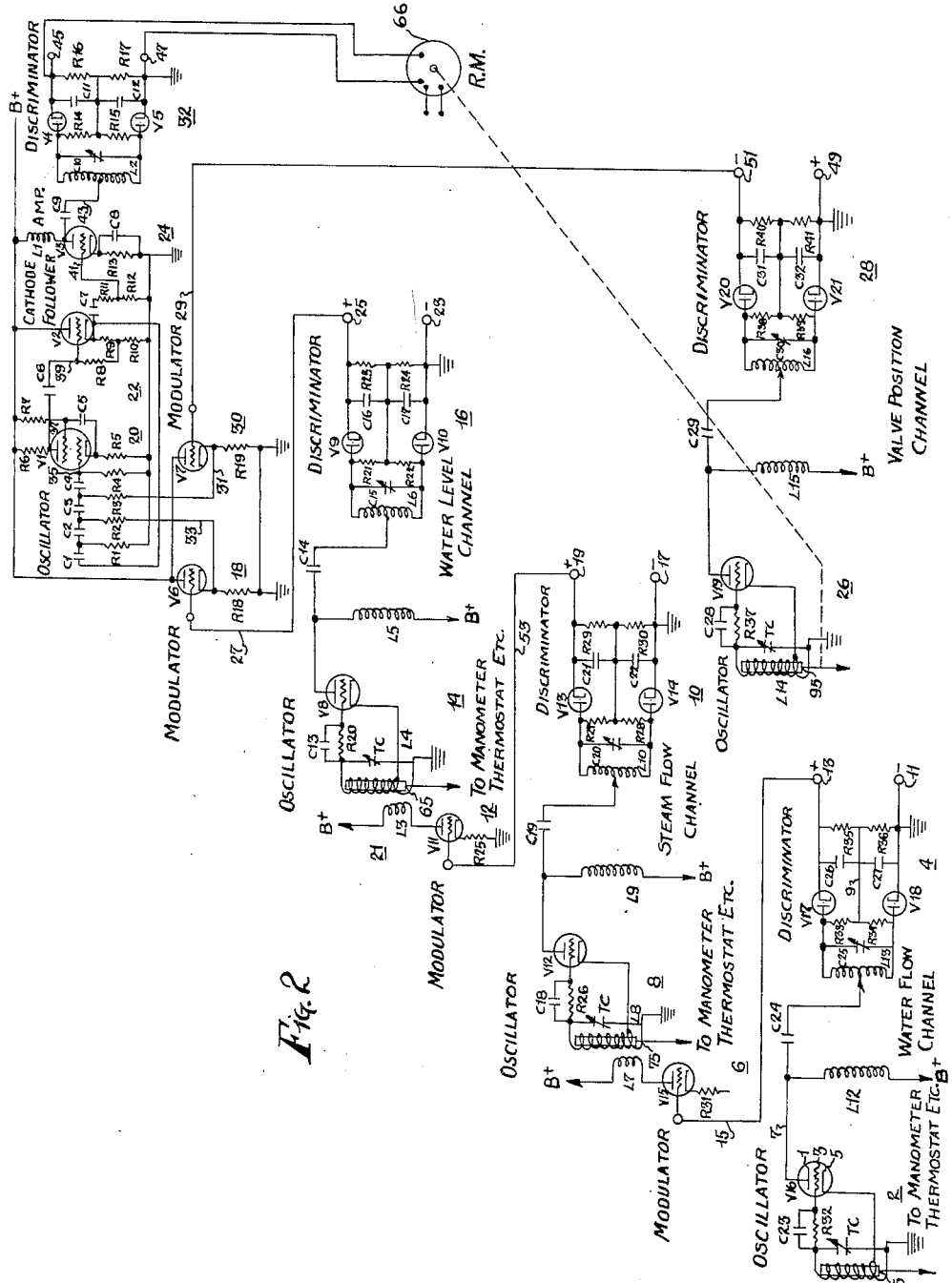
Figure 2 is an electric circuit diagram of the invention as applied to an automatic feed water regulator for boilers.

Referring now to Figure 2 it will be seen that the polarized D. C. output at 13 is then fed, by means of lead 15 to the grid of a modulator tube V15. This voltage will be a function of or correspond to the change in position of core 85. The relative change impedance of V15 is reflected across coil L7 which is closely coupled to inductance L8 of the oscillator 8 of the steam flow channel, thus changing the frequency of oscillation of 8. The reflected impedance of V15 across the tuned coil L8 is a variable function of the voltage impressed upon the grid of V15. Essentially then, the modulator V15 is a variable impedance closely coupled to a tuned circuit in such a fashion that the frequency of operation of the tuned circuit L8 is controlled over a desired range of frequency by impressing a D. C. voltage of controlled polarity and magnitude upon the grid of V15.

The steam flow channel 8 and 10 is a duplicate of the water flow channel and consists of an oscillator 8 and a discriminator 10. With the iron core 75 and tuning condenser TC, it then becomes apparent that once TC is tuned to the desired center frequency of operation, we then have two variables that can affect the frequency of operation of oscillator 8. First the iron core 75 with its pickup and second the magnitude and polarity of the D. C. voltage impressed upon the grid of modulator tube V15. With no voltage on the grid of V15 the iron core 75, actuated by its mechanical linkage and pickup is the only variable factor controlling frequency of oscillator 8 and its associated tube V12. The frequency of oscillation appearing across the plate of V12 is a function of the composite effect of any D. C. voltage on the grid of V15 and the relative position of the iron core 75 within its associated inductance L8. The oscillator tube V12 then feeds the discriminator 10 through C19 and primary coil L9 loosely coupled to L10 the discriminator secondary coil which is initially tuned to the desired center frequency of operation by C20. The operation of the discriminator 10 and its associated rectifier tubes V13 and V14 with the usual loading condensers and resistors, is entirely conventional and functions in the same manner as the water flow channel previously described. The polarity and magnitude of the D. C. voltage appearing across the output terminals 17 and 19 is then the composite or integrated effect of the frequency of oscillation of the water flow channel 2 and 4, and the frequency of oscillation of the steam flow channel 8 and 10.

The polarized voltage appearing at 19 is then fed by means of lead 53 to the grid of modulator tube V11 associated with the water level channel 14 and 16. The function of modulator 12 and its tube V11 is the same as modulator 6 and its tube V15 associated with the steam flow channel 8 and 10. However, the voltage appearing at the grid of modulator tube V11 is now the composite effect of both the water flow channel 2 and 4 and the steam flow channel 8 and 10. With the plate of V11 closely coupled to the secondary L4 by means of primary coil L3, the variable and controlled impedance of V11 then functions as usual to partially control the frequency of the oscillating circuit 14, we then have the cumulative effect of the water flow channel 2 and 4, the steam flow channel 8 and 10, and the position of the iron core 65 associated with inductance L4, all contributing to control the frequency of operation of the water level channel oscillator 14. Thus, the frequency of oscillation appearing at the plate of V8 can be the composite and integrated effect of movement of core 85 of the water flow channel 2 and 4 and/or the movement of core 75 of the steam flow channel 8 and 10 and movement of core 65 of the water level channel 14 and 16, or the movement of any one, two or all three cores. The A. C. voltage developed at the plate of V8 is fed to the secondary inductance L6 by means of the usual loosely coupled primary coil L5 and condenser C14, associated with discriminator 16. The rectifier tubes V9 and V10 with their associated components form a conventional discriminator circuit as used in the water flow 2 and 4, and the steam flow channel 8 and 10. Appearing across the output terminals 23 and 25 of the discriminator we have the usual D. C. voltage whose polarity and magnitude are determined by the cumulative and integrated frequency deviation of 2, 8 and 14.

The D. C. voltage appearing at 25 is then fed by means of lead 27 to the grid of a tube V6 associated with modulator 18.

The valve position channel 26 and 28 includes a core 95 movably responsive to changes in valve position, an oscillator 26 and discriminator 28 of the type used at 4, 8 and 14, whereby the D. C. voltage in lead 29 feeds to modulator 30, which includes triode tube V7. The oscillator 26 and discriminator 28 function in normal fashion but the mechanical linkage to the iron core 95 of 26 operates in a direction directly opposite to that of the other channels, so that the voltage appearing across the output terminals of discriminator 28 is oppositely polarized to that appearing across the output terminals of discriminators 4, 10 and 16.

The polarity and magnitude of the voltage appearing in lead 27 at any time represents the composite demand or lack of demand of the integrated water flow channel, steam flow channel, and water level channel as determined by the relative positions of the iron cores 85, 75 and 65 associated with these channels. In like manner, the polarity and magnitude of the voltage appearing in lead 29 is dependent upon the position of the control member or feed water control valve in this instance. When the system is balanced no current will appear in leads 27 and 29 since the voltage will be zero in each lead.

The modulators 18 and 30, associated with the master oscillator 20 are each connected in series with a leg of the master oscillator frequency determining network through leads 33 and 31 to ground through resistances R18 and R19, respectively. Across these series resistances appear the parallel resistance or impedance of the modulator tubes V6 and V7. Application of a voltage to the grid of V6 or V7 will then change the total resistance of the series-parallel leg presented to the frequency determining network of the master oscillator. Obviously, the total resistance of the leg concerned will then be a function of the magnitude, and polarity of the voltage appearing at the grid of the modulator involved. In this fashion the frequency of the master oscillator is changed in accordance with the demand or lack of demand of the channels feeding the modulator tubes.

The master oscillator 20 is a four terminal resistance-capacitor type of oscillator whose frequency is a function of the impedance values of the resistances and capacitors in its network. It will immediately become apparent that the exact frequency of oscillation will be dependent upon the voltage appearing in leads 27 and 29. Thus, the precise frequency of the master oscillator 20 is a direct function of the integrated and composite demand or lack of demand by the water flow, steam flow, water level and valve position channels.

The output of the master oscillator 20 feeds the cathode follower grid through lead 39 from the plate of the oscillator tube V1. The primary function of the cathode follower 22 or V2, is to isolate the input circuit of 20. In this fashion various types of loads can be coupled to the output of the cathode follower 22 without effecting the frequency stability or output voltage of the master oscillator 20.

Cathode follower 22, output is fed through lead 41 to the grid of V3 of amplifier 24, whose sole function is to amplify the voltage output of the cathode follower 22.

Through lead 43 to C9 and primary coil L1, the voltage from amplifier 24 is fed to inductance L2 of discriminator 32. This is again a conventional discriminator with its rectifier tubes V4 and V5 and their associated components. The linear and polarized output voltage developed across terminals 45 and 47 is then utilized to actuate the feed water valve control apparatus. I preferably employ suitable relays and a reversible electric motor for actuating the feed water control valve.

It will now be understood that any unbalance in the system caused by movement of the variable iron cores will result in an amplified voltage across output terminals 45 and 47 of discriminator 32, whose linear and polarized voltage is dependent upon the amount and direction of such integrated core movement.

Upon demand by any or all three of the water flow, steam flow and water level channels, the resultant voltage caused by frequency deviation will appear across output terminals 45 and 47, thus actuating the feed water valve motor in a direction dependent upon the polarity of such voltage. Movement of the feed water valve in this fashion will cause movement of the iron core of the valve position channel and the voltage in lead 29 being of opposite polarity, will then tend to cancel the voltage initially appearing at terminals 45 and 47. When the voltage developed by the valve position channel is of the same magnitude as that developed through demand of the other channels, the output voltage at terminals 45 and 47 is zero and the valve motor control apparatus ceases to operate and the system is again in balance.

Any suitable mechanical linkage means may be used for transmitting motion from the various pickups to the cores 65, 75, 85 and 95 and in Figure 3 I have illustrated one such means. A float arm 50 is pivoted within a housing 54 which communicates with the steam space of the boiler 51 through a conduit 52 and with the water space thereof through a conduit 55 whereby in a well known manner the water level in housing 54 will correspond with boiler water level. At its pivotal axis the float arm 50 is fixed to a shaft which extends externally of housing 54 through suitable sealing means. The external portion of the shaft has a lever 56 fixed thereto which in turn is connected to core 65 whereby any rocking movement of the float arm caused by a change in boiler water level will result in movement of core 65 and resultantly change the inductance of the coil or coils associated with core 65.

A steam flow conduit 57 extending from the boiler steam space is provided with a reduced diameter orifice as by means of a perforated disc 58 fixed to the internal wall of conduit 57. Pipes 59 and 61 extending from the upstream and downstream side of the orifice respectively communicate with a conventional fluid pressure motor 62. The motor comprises a lower circular portion divided by a flexible diaphragm providing a lower chamber subjected to the pressure in pipe 59. The diaphragm also provides an upper chamber which is subjected to the pressure in pipe 61. A preferably adjustable compression spring in the upper chamber has its upper convolution engaging an abutment (not shown) and its lower convolution engaging the diaphragm. When the pressure in pipe 59 or the lower chamber exceeds the combined effect of the pressure in 61 or the upper chamber and the spring the diaphragm will be moved upwardly and will be moved downwardly under reverse conditions. An upstanding rod connects the diaphragm with the free end of a pivoted horizontal arm. This arm is operatively connected to an externally disposed arm 63 whereby arm 63 will be rocked in accordance with diaphragm movement or in accordance with changes in the rate of steam flow. Arm 63 is connected to core 75 whereby rocking movement of the arm will cause axial change of position of the core and resultantly change the inductance of coils associated with the core.

In a similar manner the water flow line indicated at 64 is provided with an orifice 68 and through pipes 69 and 71 opposite sides of the orifice are connected with a fluid pressure motor 72 whereby arm 73 will be rocked in accordance with changes in rate of water flow and resultantly move core 85 to change the inductance of its associated coils.

The control member or feed water regulating valve is indicated at 67. The valve is operated by conventional apparatus including a reversible electric motor 66 which through suitable reduction is adaptable to rotate a depending threaded shaft relatively slowly in either direction. The shaft engages an internally threaded and non-rotatable sleeve which is operatively connected to the valve stem whereby axial movement of the sleeve determines the valve position. The sleeve is connected to core 95 so that the core will be moved axially in accordance with change in valve position and resultantly change the inductance of its associated coil.

Although I have illustrated and described my control system as adapted to boiler feed water regulating apparatus it will be understood that it is equally adaptable to any system wherein a control member must be actuated to restore a condition of balance due to unbalance in the system caused by a change in one or more variable conditions affecting the system.

I wish it to be understood that I do not desire to be limited to the exact details of construction shown and described, for obvious modification will occur to persons skilled in the art.

What I claim as new and desire to secure by Letters Patent of the United States is:

1. An electronic control system adapted to regulate a control member of the type movable in reverse directions by electric power means in response to the integrated demand of a plurality of variables, and with each variable and the control member having means associated therewith for translating departure from a given condition into mechanical movement, said system being free of mechanical friction other than friction generated by said mechanical movements said electronic system comprising a balanceable electrical circuit, each variable having a channel including an oscillator whose frequency is altered in accordance with the mechanical movement resulting from the departure of said variable from a given condition, each channel having a discriminator for deriving control voltages, a plurality of modulators for proportioning and mixing the voltages of the channels whereby a single modulator will have a voltage corresponding to the integrated value of the voltages of said channels, a channel for the control member including an oscillator whose frequency is altered in accordance with the mechanical movement resulting from the departure of said control member from a given condition, a discriminator and a modulator; the oscillators of the variable and control member channels each comprising an inductance coil connected in series-parallel with a capacitor and resistance and thence to the grid of a vacuum tube, an iron core encircled by the inductance coil in spaced relation and freely movable axially therein, the core of each variable channel being mechanically connected to and movable by a pickup for its associated variable and the core of the control member channel being mechanically connected to and responsive to movement of the control member, each tube being connected to a source of D. C. current, the discriminator of each channel comprising a center tapped inductance coil connected through a capacitor to the tube of its associated oscillator whereby A. C. current will be transmitted to said coil at a frequency variable in accordance with movement of the core of said channel, and rectifying means whereby a change of oscillator frequency will be translated to a polarized D. C. voltage dependent upon the direction and magnitude of the frequency deviation from a desired center frequency of operation, the said plurality of modulators each comprising a vacuum tube having its grid connected to the discriminator of one channel to receive polarized D. C. voltage and its plate connected to a source of D. C. current through an impedance coil, the impedance coil being closely coupled to the inductance coil associated with the iron core of a second channel whereby the frequency of the oscillator of the second channel is dependent upon the voltage impressed on the modulator tube grid by the discriminator of said one channel and the position of the iron core of the second channel; a master oscillator, the said single modulator and control member modulator being connected to the master oscillator whereby the frequency of said master oscillator will be determined by the integrated voltage of said single and control member modulators, a voltage and frequency stabilizing means connected to the master oscillator, means for amplifying the voltage of the stabilizing means, a discriminator connected to the amplifying means adapted to apply voltage to the electric power means for the control member, and the mechanical movement means of the control member being adapted to move relative to the mechanical movement means of the variables whereby the voltage of the control member discriminator is of opposite polarity to the integrated voltage of the variables and when the control member is moved to a position equalizing these voltages the system is in balance stopping movement of the control member.

2. An electronic control system adapted to regulate a control member of the type movable in reverse directions by electric power means in response to the integrated demand of a plurality of variables, each variable and the control member having means associated therewith for translating departure from a given condition into mechanical movement, and said system being free of mechanical friction other than friction generated by said mechanical movements, said electronic system comprising a balanceable electric circuit, each variable having a channel including an oscillator whose frequency is altered in accordance with the mechanical movement resulting from the departure of said variable from a given condition, each channel having a discriminator for deriving control voltages, a plurality of modulators for proportioning and mixing the voltages of the channels whereby a single modulator will have a voltage corresponding to the integrated value of the voltages of the channels, a channel for the control member including an oscillator whose frequency is altered in accordance with the mechanical movement resulting from the departure of said control member from a given condition, a discriminator and a modulator; the oscillators of the variable and control member channels each comprising an inductance coil connected in series-parallel with a capacitor and resistance and thence to the grid of a vacuum tube, an iron core encircled by the inductance coil in spaced relation and freely movable axially therein, the core of each variable channel being mechanically connected to and movable by a pickup for its associated variable and the core of the control member channel being mechanically connected to and responsive to movement of the control member, each tube being connected to a source of D. C. current, the discriminator of each channel comprising a center tapped inductance coil connected through a capacitor to the tube of its associated oscillator whereby A. C. current will be transmitted to said coil at a frequency variable in accordance with movement of the core of said channel, and rectifying means whereby a change of oscillator frequency will be translated to a polarized D. C. voltage dependent upon the direction and magnitude of the frequency deviation from a desired center frequency of operation, the said plurality of modulators each comprising a vacuum tube having its grid connected to the discriminator of one channel to receive polarized D. C. voltage and its plate connected to a source of D. C. current through an impedance coil, the impedance coil being closely coupled to the inductance coil associated with the iron core of a second channel whereby the frequency of the oscillator of the second channel is dependent upon the voltage impressed on the modulator tube grid by the discriminator of said one channel and the position of the iron core of the second channel; a master oscillator, the said single modulator and control member modulator being connected to the master oscillator whereby the frequency of said master oscillator will be determined by the integrated voltage of said single and control member modulators, a voltage and frequency stabilizing means connected to the master oscillator, means for amplifying the voltage of the stabilizing means, and a discriminator connected to the amplifying means adapted to apply voltage to the electric power means for the control member whereby the control member will be moved in a direction causing its associated modulator to increasingly oppose the voltage until the said circuit is balanced.

3. An electronic control system adapted to regulate a control member of the type movable in reverse directions by electric power means in response to the integrated demand of a plurality of variables, each variable and the control member having means associated therewith for translating departure from a given condition into mechanical movement, and said system being free of mechanical friction other than friction generated by said mechanical movements, said electronic system comprising a balanceable electric circuit, each variable having a channel including an oscillator whose frequency is altered in accordance with the mechanical movement resulting from the departure of said variable from a given condition, said channel oscillators each comprising an inductance coil connected to a source of D. C. current and a discriminator through a vacuum tube, an iron core encircled by the inductance coil in spaced relation and freely movable axially therein, the core being mechanically connected to and movably responsive to the pickup for a variable, the channel for a first variable having a circuit including a discriminator with a center tapped inductance connected to the oscillator vacuum tube, tuning means for the oscillator and discriminator of said channel, and rectifying means in the discriminator circuit whereby when the discriminator inductance is set at its center frequency and the oscillator is tuned to said frequency no voltage will exist across the output terminals of the discriminator and when the iron core of said oscillator is moved from said tuned frequency position a polarized D. C. voltage will be created across the terminals of said discriminator in accordance with the magnitude and direction of said core movement; a modulator comprising a vacuum tube having a grid adaptable to have the discriminator voltage of the first variable channel impressed thereon, said modulator tube being connected to a source of D. C. current through an impedance coil, said impedance coil being closely coupled to the oscillator inductance coil of the channel for a second variable, the channel for the second variable generally corresponding to the channel for the first variable including a discriminator tunable with an oscillator and an iron core freely movable within the second channel inductance coil whereby the D. C. voltage output of the second variable channel discriminator will be determined by the impressed voltage on the modulator tube grid from the first variable channel discriminator and the position of the iron core associated with the oscillator inductance coil of the second variable channel, a second modulator including a vacuum tube having a grid adapted to have D. C. voltage representing the composite effect of the positions of the iron cores associated with the aforesaid channels impressed thereon, the control member having a channel generally corresponding to the aforesaid channels including an oscillator tunable with a discriminator and an iron core freely movable within the oscillator inductance coil and connected to and movably responsive to the control member in a direction to create voltage at its channel discriminator opposing the voltage created by the variables, a third modulator connected to the discriminator of the control member channel, a master oscillator connected to said second and third modulators whereby the frequency of said master oscillator will be determined by the integrated voltage of said second and third modulators, circuit means from master oscillator for applying voltage to the electric power means for the control member, and the control member and its mechanical movement means being adapted to move until the voltage of opposite polarity created at the discriminator for the control member channel equalizes the integrated voltage of the channels for the variables whereby the system is in balance and movement of the control member stops.

4. The control system as described in claim 3 and wherein the control member is a feed water valve for a boiler and is movably responsive to variations in rate of feed water flow, boiler water level and rate of steam outflow tending to unbalance the system, the first variable channel having its iron core mechanically connected to a water flow pick up and movably responsive to variations in feed water flow, the second variable channel having its iron core mechanically connected to a water level pickup and movably responsive to variations in water level, and a third variable channel is provided generally corresponding to the channels for the first and second variables, the third variable channel including a modulator having a vacuum tube adapted to have the D. C. voltage of the discriminator for the second variable channel impressed on the grid thereof, said third channel having an oscillator tunable with a discriminator, the oscillator having an inductance coil loosely encircling an iron core and closely coupled to an impedance coil extending from the modulator tube to a source of D. C. current, the iron core being mechanically connected to a steam flow pickup and movably responsive to variations in steam flow, the said third variable channel discriminator being adapted to create a D. C. voltage representing in polarity and magnitude the composite movement of said iron cores associated with the variable channels from predetermined positions, and a connection extending from said third channel discriminator to the grid of said second modulator tube.

References Cited in the file of this patent

UNITED STATES PATENTS

| | | |
|---|---|---|
| 1,944,315 | Clapp | Jan. 23, 1934 |
| 1,975,086 | Dickey | Oct. 2, 1934 |
| 2,098,913 | Dickey | Nov. 9, 1937 |
| 2,120,048 | Turner | June 7, 1938 |
| 2,405,573 | Frisch | Aug. 13, 1946 |
| 2,423,229 | Crosby | July 1, 1947 |
| 2,457,790 | Wild | Dec. 28, 1948 |
| 2,474,354 | Guanella | June 28, 1949 |
| 2,535,248 | Wild | Dec. 26, 1950 |
| 2,558,683 | Hart | June 26, 1951 |
| 2,608,351 | Smoot | Aug. 26, 1952 |